(12) United States Patent
Matsuzaki et al.

(10) Patent No.: US 7,938,221 B2
(45) Date of Patent: May 10, 2011

(54) SUSPENSION SYSTEM FOR VEHICLE

(75) Inventors: Akihiro Matsuzaki, Sakai (JP); Atsushi Hayashi, Nara (JP); Nobuyuki Okabe, Izumi (JP); Toshimitsu Yazaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/724,897

(22) Filed: Mar. 16, 2010

(65) Prior Publication Data

US 2010/0244394 A1 Sep. 30, 2010

(30) Foreign Application Priority Data

Mar. 27, 2009 (JP) ................. 2009-079267

(51) Int. Cl.
*B60K 17/00* (2006.01)
(52) U.S. Cl. ........ 180/352; 180/353; 180/354; 180/358; 280/124.14; 280/124.19
(58) Field of Classification Search ............ 280/124.14, 280/124.18, 124.12, 124.19; 180/352, 353, 180/354, 358, 360, 376
See application file for complete search history.

(56) References Cited

U.S. PATENT DOCUMENTS

| | | | |
|---|---|---|---|
| 1,792,160 A | 2/1931 | Granges | |
| 4,541,653 A | 9/1985 | Raidel | |
| 4,669,571 A * | 6/1987 | Kurde | 180/348 |
| 4,705,128 A * | 11/1987 | Krude | 180/348 |
| 5,016,912 A * | 5/1991 | Smith et al. | 280/6.151 |
| 5,562,179 A * | 10/1996 | McAdam | 180/379 |
| 6,216,812 B1 * | 4/2001 | Pertusi | 180/339 |
| 6,345,680 B1 * | 2/2002 | Hill | 180/376 |
| 6,357,769 B1 * | 3/2002 | Omundson et al. | 280/124.109 |
| 6,758,302 B2 * | 7/2004 | Penzotti | 180/383 |
| 6,782,965 B2 * | 8/2004 | Sztykiel et al. | 180/292 |
| 7,232,004 B2 * | 6/2007 | Bartel | 180/292 |
| 7,568,546 B2 * | 8/2009 | Bartel | 180/292 |
| 7,617,892 B2 * | 11/2009 | Nishimoto et al. | 180/53.4 |
| 2009/0020975 A1 | 1/2009 | Iwami et al. | |

FOREIGN PATENT DOCUMENTS

| | | |
|---|---|---|
| DE | 690821 C | 10/1941 |
| DE | 4427172 A1 | 2/1996 |
| EP | 0761481 B1 | 3/1997 |
| GB | 339625 A | 12/1930 |
| GB | 840583 A | 7/1960 |

OTHER PUBLICATIONS

The Automotive Technology Handbook, Society of Automotive Engineers of Japan Inc., 1990, vol. 5.

* cited by examiner

*Primary Examiner* — Toan C To
(74) *Attorney, Agent, or Firm* — The Webb Law Firm

(57) ABSTRACT

A suspension system for a vehicle includes a swing frame and right and left suspension cylinders for front wheels. The swing frame is swingably supported by the front portion of a vehicle body about a support shaft extending in a lateral direction, and supports the front axle case, so as to allow the front axle case to swing about a center shaft extending in a front-rear direction. The right and left suspension cylinders are provided on the swing frame. A lateral oscillation regulation unit is provided between the swing frame and the front frame, and configured to regulate an oscillation of the swing frame by contact in the lateral direction.

4 Claims, 7 Drawing Sheets

SUSPENSION SYSTEM FOR VEHICLE

BACKGROUND OF THE INVENTION

1. Field of the Invention

The present invention relates to a suspension system for a vehicle, such as tractor.

2. Description of the Related Art

As the prior art of a suspension system for a vehicle, a technique of EP0761481B1 has been known in which: to a vehicle body is attached an engine whose rear portion is connected to a transmission case and whose front portion has a front frame projecting frontward; a front portion of the vehicle body is configured to support a rear portion of a swing frame swingable about a support shaft extending in a lateral direction; the swing frame is configured to support a front axle case (having suspended front wheels) swingable about a center shaft extending in a front-rear direction; and on the front frame is provided right and left suspension cylinders for the front wheels, which absorb, through the swing frame, impacts transmitted from the front wheels to the front axle case.

With respect to the swing frame, a front portion may rock (or oscillate) laterally with the support shaft provided in the rear portion serving as a center of oscillation, due to loads on the right and left front wheels. In order to prevent the durability of the support shaft from reducing, which may otherwise be caused by the oscillation load, a lateral oscillation regulation unit is provided.

Generally in a four-wheel vehicle, a braking force and an accelerating force acting on the front axle case are shared by right and left lower links, right and left upper links and the like, and a load in the lateral direction is shared by a lateral rod. As the lateral oscillation regulation unit, a lateral rod has been used, whose one end is pivotally supported by the vehicle body, and whose the other end is pivotally supported by the front axle case (see, for example, Automotive Technology Handbook, Designing (Chassis), p 8-9, published by Society of Automotive Engineers of Japan, Inc.). In the case where the lateral rod connecting the vehicle body and the front axle case is used for regulating a lateral oscillation of the swing frame, when the front axle case vertically swings, a front axle case-end of the lateral rod undergoes an arc movement with a vehicle body side-end serving as a movement center. Therefore, the front portion of the swing frame supports a load in the lateral direction while rocking in the lateral direction. As a result, it becomes difficult to prevent the support shaft in the rear portion of the swing frame from being affected by overload.

SUMMARY OF THE INVENTION

It would be desirable to provide a suspension system for a vehicle that can solve the above-described problem of the prior art.

Accordingly, there is provided a suspension system for a vehicle including an engine, a vehicle body including a front portion having a front frame extending frontward from the engine, and a front axle case having front wheels suspended thereby, the system including: a swing frame; and right and left suspension cylinders for the front wheels, wherein the swing frame is swingably supported by the front portion of the vehicle body about a support shaft extending in a lateral direction, the swing frame being configured to support the front axle case, so as to allow the front axle case to swing about a center shaft extending in a front-rear direction; the right and left suspension cylinders are provided on the swing frame, and a lateral oscillation regulation unit is provided between the swing frame and the front frame, and configured to regulate an oscillation of the swing frame by contact in the lateral direction.

The right and left suspension cylinders for the front wheels are configured to absorb impacts in a direction about the support shaft acting on the swing frame from the front wheels through the front axle case. When the load changes, a height of the vehicle body changes, which makes the swing frame swing about the support shaft, and thus a gap in a vertical direction between the front frame and the front axle case changes. When a load in the lateral direction, transmitted from the front wheels, acts on the swing frame, the front portion of the swing frame tends to rock (oscillate) with the rear portion supported by the support shaft serving as a oscillation center, but the lateral oscillation regulation unit regulates the rocking (oscillation) of the swing frame. With this configuration of the suspension system according to the present invention, without connecting the front frame and the swing frame, the lateral oscillation of the swing frame can be regulated by contact in the lateral direction.

In one preferable embodiment of the present invention, the front frame includes right and left side walls configured to flank the swing frame, and the lateral oscillation regulation unit includes a rolling body which is configured to brought into contact with the side wall, and the rolling body is configured to roll over a side face portion defined by the front frame. When the swing frame slightly oscillates in the lateral direction, the rolling body is brought into contact with the side wall of the front frame as the side face portion, and thus further oscillation in the lateral direction of the swing frame can be regulated. Between the swing frame and the front frame, a contacting state in the lateral direction is produced instead of a connecting state. Therefore, even when the swing frame swings about the support shaft, the oscillation of the swing frame in the lateral direction can be regulated always in the same manner.

It is also preferable that the side face portion as a contact partner to be brought into contact with the rolling body is provided by a surface of a contact plate removably fixed to the side wall. When the contact plate is abraded by the contact with the rolling body, the contact plate can be replaced, and thus maintenance of the gap between the rolling body and the contact plate becomes easy.

When a front portion of the swing frame is positioned inside the front frame, and the lateral oscillation regulation unit is positioned between the front portion of the swing frame and the front frame, an oscillation of the swing frame in the lateral direction can be regulated at a position as far as possible from the support shaft and thus a lateral load acting on the support shaft can be made small.

By placing the lateral oscillation regulation unit inside the front frame, intrusion of mud thereinto can be suppressed, and at the same time the vehicle can be made compact.

DETAILED DESCRIPTION OF THE PREFERRED EMBODIMENTS

Hereinbelow, embodiments of the present invention will be described with reference to the drawings.

Figure 5:
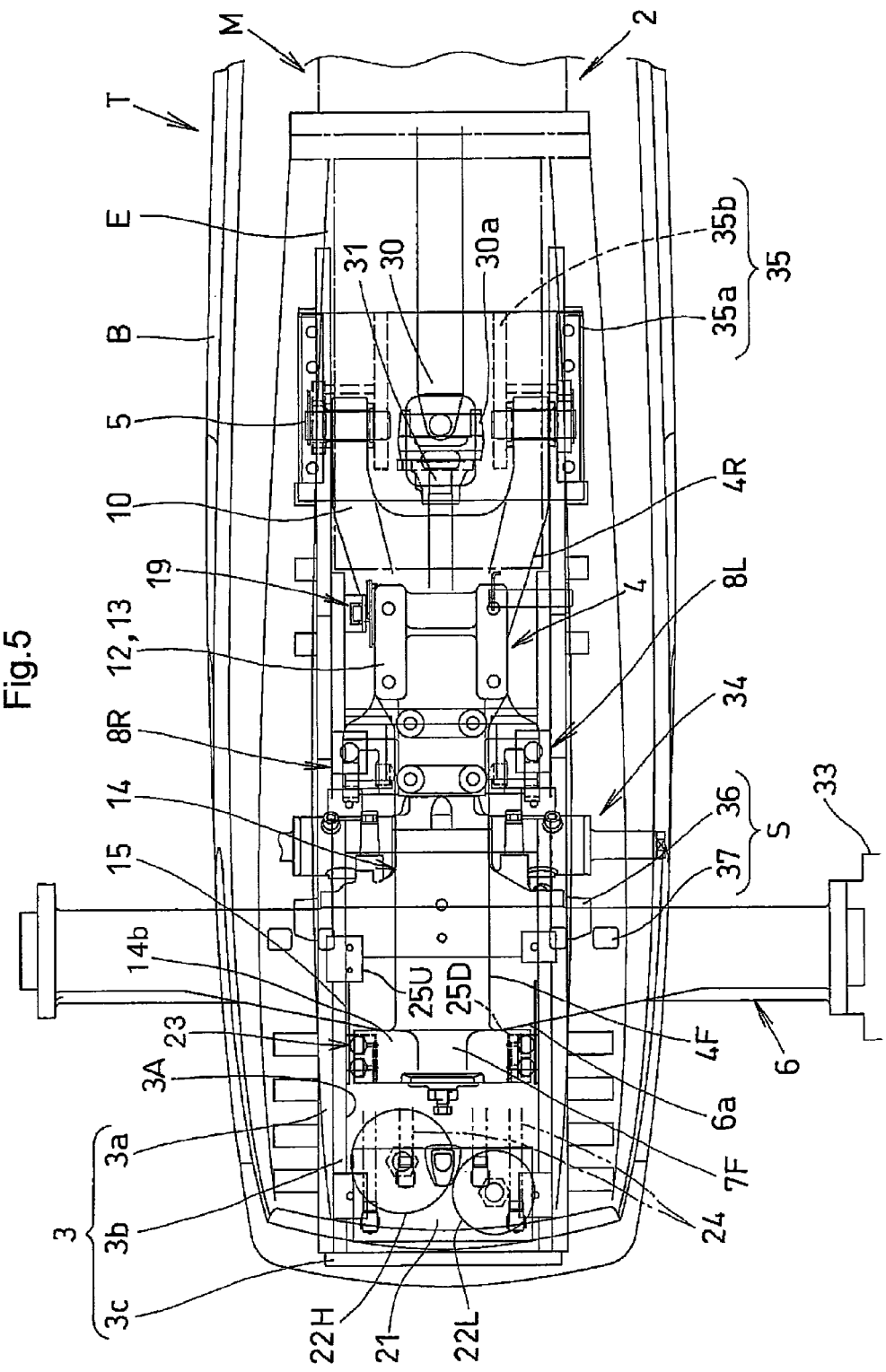
FIG. 5 is a plan view of a front portion of a tractor.
Figure 6:
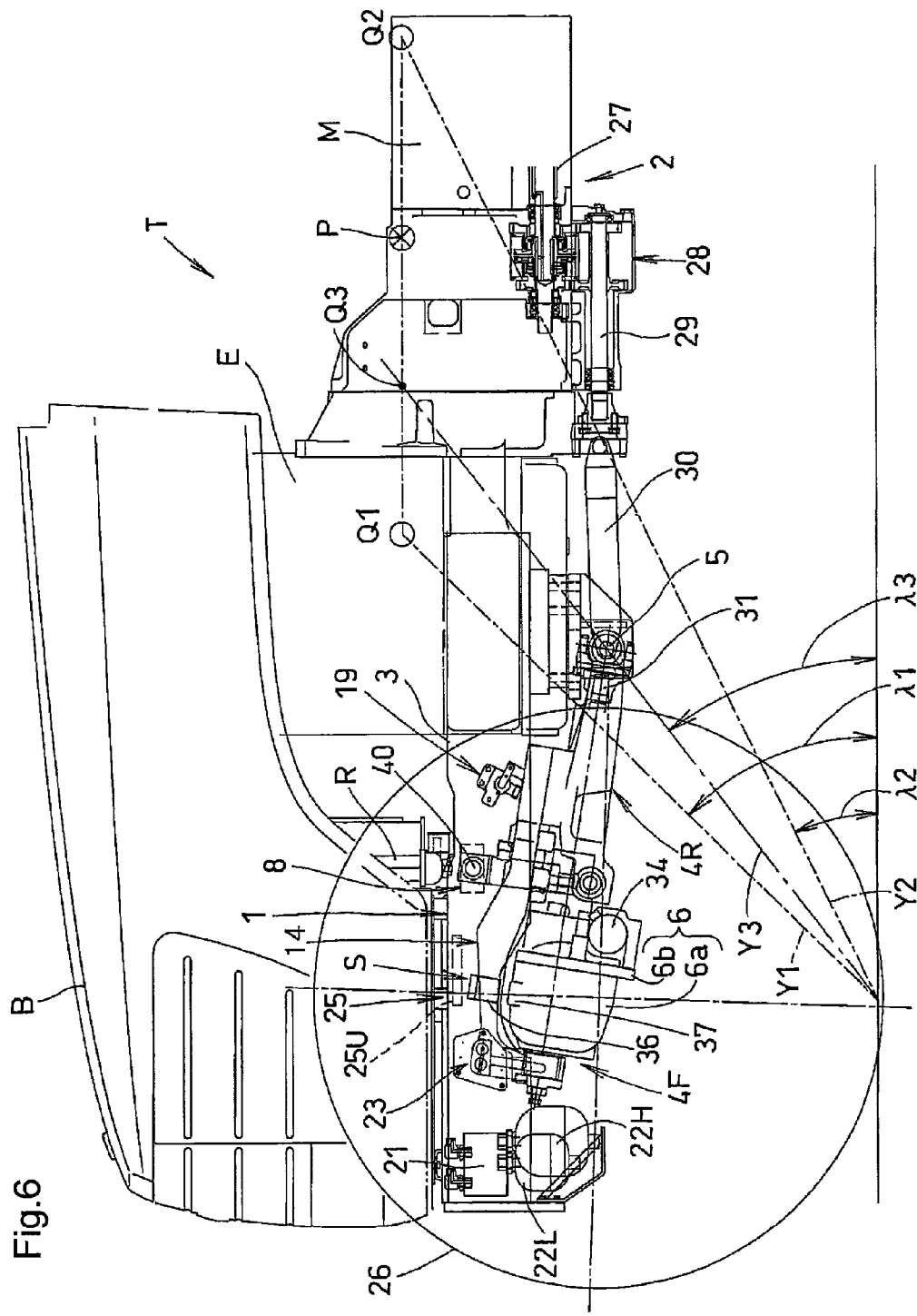
FIG. 6 is a side view of the front portion of the tractor.

Referring to FIGS. 5 and 6 showing a front portion of a tractor T, the tractor T includes a vehicle body 2 in which a front transmission case M and a rear transmission case are connected to a rear portion of an engine E, from which a front frame 3 protrudes frontward which supports a front axle case 6 configured to suspend right and left front wheels 26.

On the front frame 3, there are mounted a radiator R, a battery and the like, which are covered with a bonnet B. On a rear upper side of the vehicle body 2, there are provided a steering wheel, a driver's seat and the like.

A front wheel driving force is taken out from a rear wheel differential pinion shaft of the rear transmission case, which is then transmitted from an inner transmission shaft 27 of the front transmission case M through a front wheel transmission mechanism 28 to an outer transmission shaft 29, and further transmitted from the outer transmission shaft 29 through a universal coupling shaft 30 to a front wheel differential pinion shaft 31 of the front axle case 6.

The front wheel transmission mechanism 28 is of a hydraulic switching type, and is configured to switch a front wheel force of the inner transmission shaft 27 between a state that attains a speed equivalent to the speed of the rear wheel and a state that attains a speed 1.3 to 2.0 times faster than the speed of the rear wheel, and to transmit the force to the outer transmission shaft 29.

The front axle case 6 is tapered from an intermediate enlarged portion 6a having a front wheel differential device built therein towards right and left outer ends. On each of the right and left outer ends, there is provided a final reduction mechanism 33, and on a rear side of the intermediate enlarged portion 6a, there is provided a rear lid 6b equipped with a bearing case on which a steering cylinder 34 is disposed.

Referring to FIGS. 1 to 8, the front axle case 6 is supported by a swing frame 4 in such a manner that the right and left outer ends of the front axle case 6 are vertically movable, and the front axle case 6 is swingable about a center shaft 7 as a center pin. In a front portion of the intermediate enlarged portion 6a, a center shaft front portion 7F of the center shaft 7 is formed, while in a rear portion of the rear lid 6b equipped with the bearing case, a center shaft rear portion 7R is formed.

The front frame 3 includes a pair of right and left outer plates 3a, a pair of right and left inner plates 3b and a front plate 3c. The outer plate 3a and the corresponding inner plate 3b overlap side by side and are fixedly coupled by fixtures, such as bolt nut, welding, or the like. Between front end portions of the right and left outer plates 3a (to put it another way, between front end portions of the right and left inner plates 3b), the front plate 3c is fixedly coupled by fixture, welding, or the like. An inner face of the right (left) inner plate 3b serves as a right (left) side wall 3A of the front frame 3.

Between the front frame 3 and the front axle case 6, there is provided a suspension mechanism 1 configured to absorb impacts or vibrations from agricultural field, road surface or the like, to adjust a height of the front portion of the tractor T, and to tilt the front portion. The suspension mechanism 1, the front frame 3 and the front axle case 6 constitute a suspension system.

The suspension mechanism 1 includes: the swing frame 4 which is supported by the front frame 3 swingably about a support shaft 5, and is configured to support the front axle case 6 swingably about a center shaft 7 (having a shaft center extending in a front-rear direction); a pair of right and left suspension cylinders 8 each provided between the front frame 3 and the swing frame 4; a hydraulic valve 21 and an accumulator 22 communicated with the right and left suspension cylinders 8; and the like.

Figure 1:
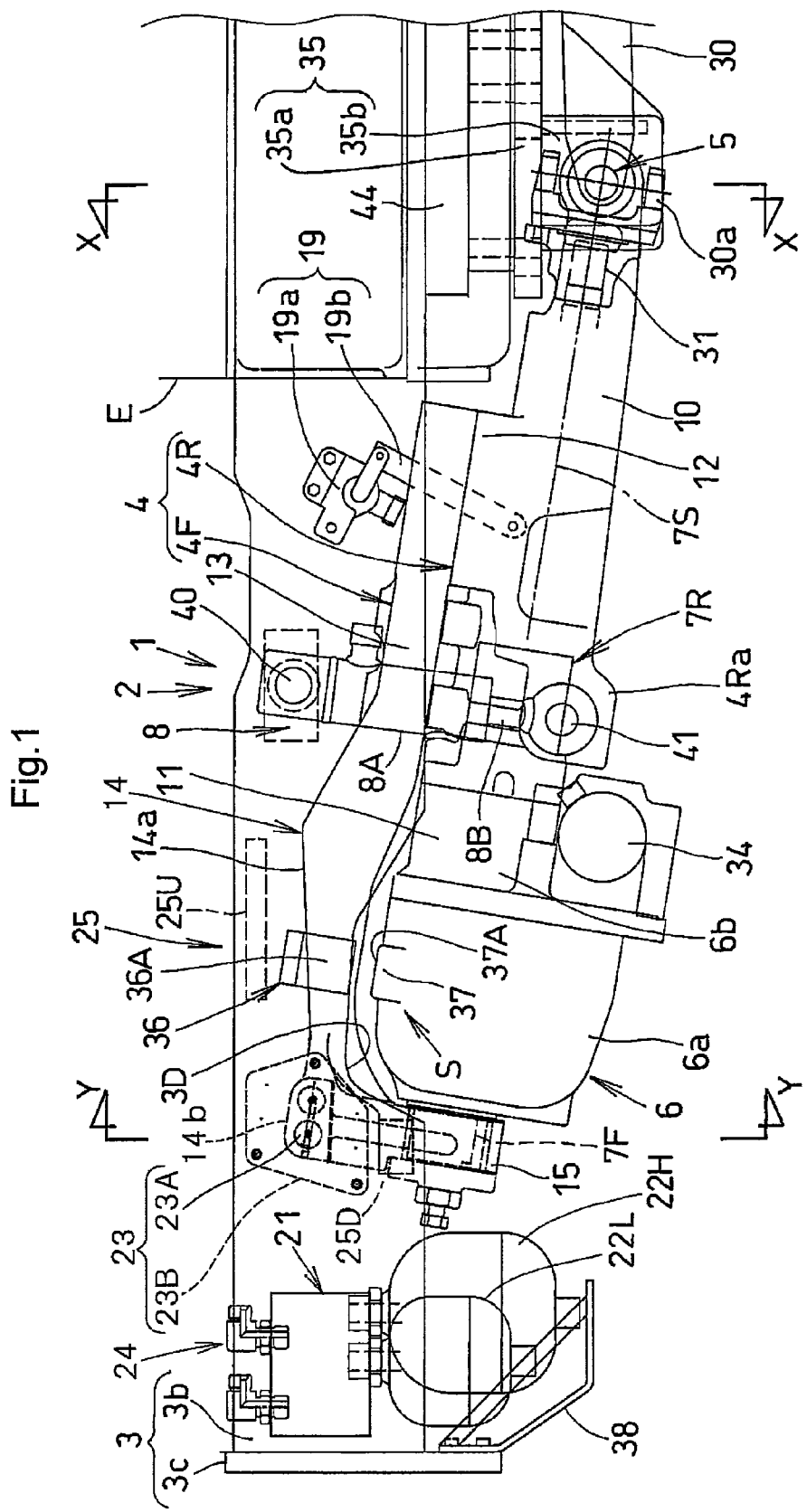
FIG. 1 is a side view showing a relevant portion of one embodiment of the present invention.
Figure 2:
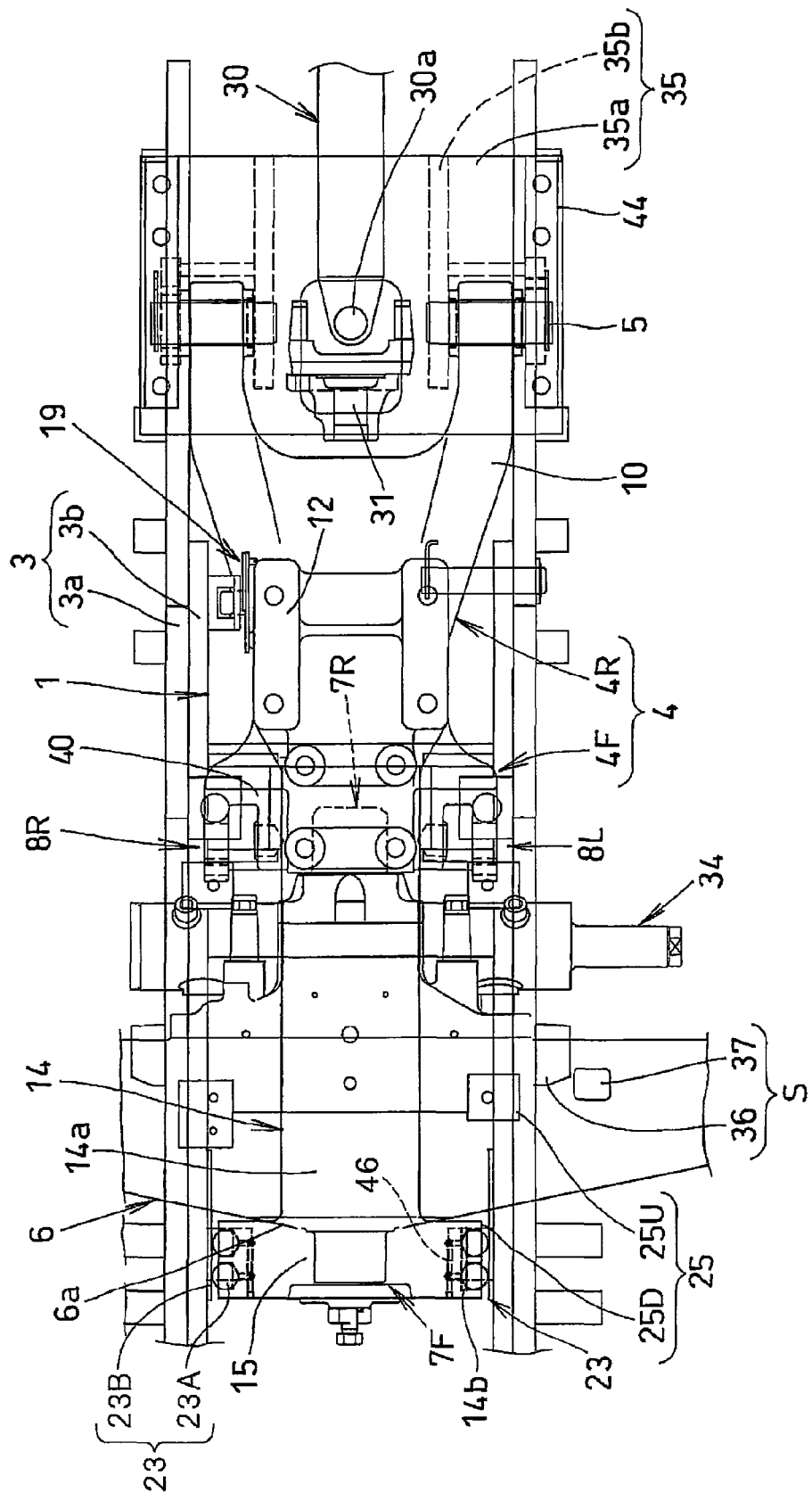
FIG. 2 is a plan view of the same.
Figure 7:
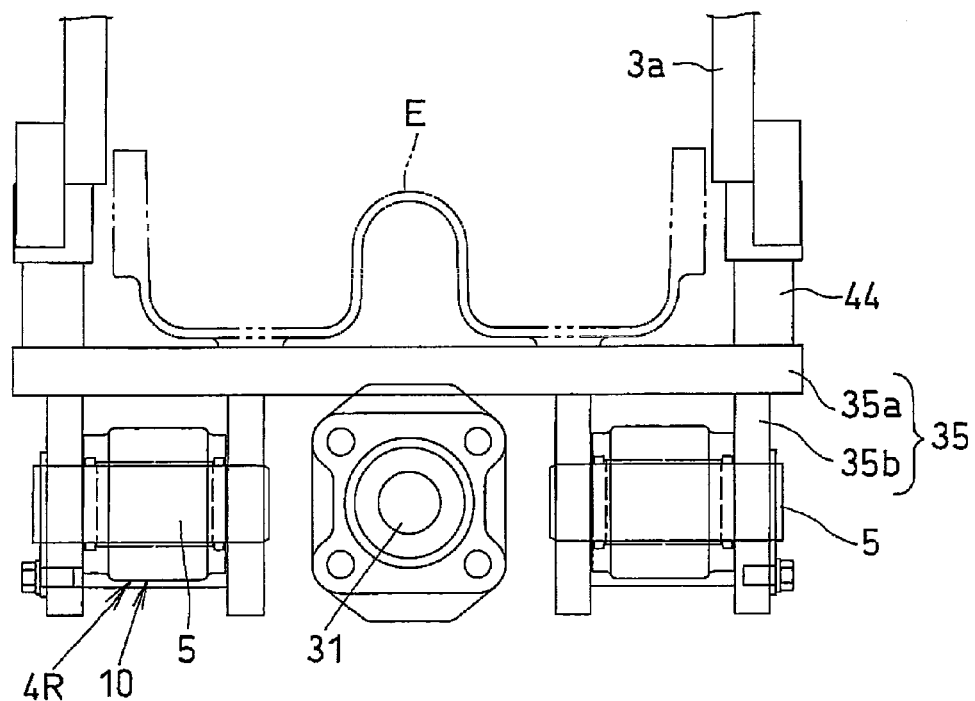
FIG. 7 is a cross-sectional view taken along a line X-X in FIG. 1.
Figure 8:
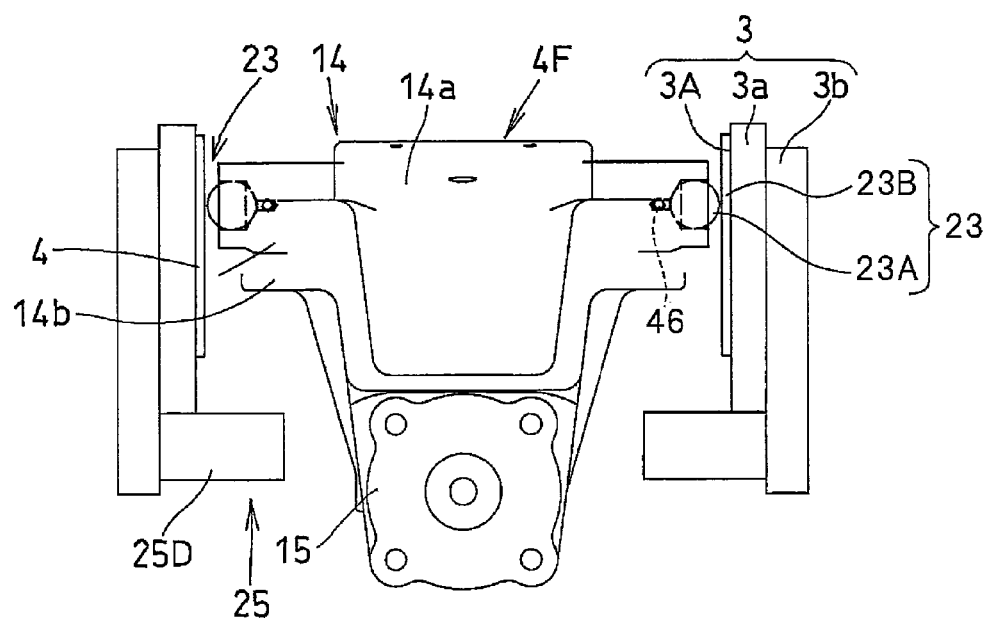
FIG. 8 is a cross-sectional view taken along a line Y-Y in FIG. 1.

In FIGS. 1, 2 and 7, on a lower face of a rear portion of the front frame 3, a mounting stage 44 is provided, to which a support bracket 35 made of sheet-metal or cast is fixed. The support bracket 35 is located immediately below the engine E. The support bracket 35 includes: a fixing portion 35a formed of a horizontal plate; and a pair of right and left shaft support portions 35b formed of two plates which are fixed to right and left portions, respectively, of a lower face of the fixing portion 35a and protruding downward. Each of the right and left shaft support portions 35b is bifurcated and the corresponding support shaft 5 penetrates therethrough.

Each of the right and left support shafts 5 has a shaft center oriented in a lateral direction and the support shafts 5 are concentric to each other. The support shafts 5 are also arranged so as to be substantially concentric, in terms of vertical direction, to a rotational center of a cross joint 30a, which is a front joint of the universal coupling shaft 30.

In addition, a shaft center 7S of the center shaft 7 is arranged so as to be substantially orthogonal in a plane, to the shaft center of the support shaft 5 and the rotational center of the cross joint 30a, which makes the members frontward of the support shaft 5 swingable about the support shaft 5. In other words, the swing frame 4 and the front axle case 6 are swingable about the support shaft 5, and even when they swing, the front wheel differential pinion shaft 31 can be rotated normally.

The swing frame 4 includes: a front swing frame 4F configured to support a front portion of the front axle case 6; and a rear swing frame 4R which is connected to the front swing frame 4F and pivotally supported by the support shaft 5, while supporting a rear portion of the front axle case 6.

The rear swing frame 4R is composed of: right and left support shaft bearings 10 as bifurcated ends in an rear end portion of the rear swing frame 4R when seen from above, each of which is configured to fit with the corresponding right or left support shaft 5; a rear shaft bearing 11 configured to fit with the center shaft rear portion 7R of the front axle case 6 frontward of the right and left support shaft bearings 10; and a mount portion 12 which extends from a front portion of the right and left support shaft bearings 10 to the rear shaft bearing 11 and has a flat face on an upper side thereof.

The front swing frame 4F is in an approximately rectangular shape when seen from above and in an L-shape when seen from a side, and includes: a fixing portion 13 removably fixed onto the mount portion 12 of the rear swing frame 4R using bolt or the like; a support portion 14 which protrudes frontward from the fixing portion 13, passing above the front axle case 6; and a front bearing 15 which protrudes downward from a front portion of the support portion 14 and is configured to fit with the center shaft front portion 7F of the front axle case 6.

The swing frame 4, formed of the front swing frame 4F and the rear swing frame 4R, is in a squared U-shape when seen from a side and extends above the intermediate enlarged portion 6a of the front axle case 6. The fixing portion 13 and the support portion 14 of the front swing frame 4F, forming an upper portion of the swing frame 4, is disposed between the right and left side walls 3A of the front frame 3. The front frame 3 has a constricted portion 3D formed therein which opposes the intermediate enlarged portion 6a of the front axle case 6, and by allowing right and left outer portions of the intermediate enlarged portion 6a to enter the space formed by the constricted portion 3D, the swing frame 4 can be raised higher.

Between an inner face of the front frame 3 and an intermediate portion in the front-rear direction of the swing frame 4, there is provided a vertical position sensor 19 configured to detect a vertical position (ascending and descending) of the front frame 3. The vertical position sensor 19 has a sensor body 19a fixed to the right and left side walls 3A of the front frame 3, and a sensor rod 19b whose tip end is connected to a side face of the rear shaft bearing 11 of the rear swing frame 4R or the fixing portion 13 of the front swing frame 4F.

Between the swing frame 4 and the front frame 3, especially between a front portion of the swing frame 4 and the inner face of the front frame 3, there is provided a lateral oscillation regulation unit 23 configured to regulate oscillation (rocking) in the lateral direction of the swing frame 4. The lateral oscillation regulation unit 23 is formed of a rolling body 23A provided on a swing frame 4 side, and a contact plate 23B provided on a front frame 3 side. The rolling body 23A is a steel sphere or ball.

As shown in FIGS. 1, 2, 5, 6 and 8, from a front upper portion of the support portion 14 of the swing frame 4, projections 14b are protruding laterally outward, and a hole is drilled in an end face of each of the right and left projection 14b, into which two (front and rear) rolling bodies 23A are rollably fitted. In each projection 14b is also formed a grease channel 46 for lubricating these two rolling bodies 23A.

Onto areas of the right and left side walls 3A of the front frame 3 opposed to the upper front portion of the support portion 14, the contact plate 23B is removably fixed (by bolt), and forms a contacting face with which the rolling bodies 23A are substantially brought into contact. The right and left contact plates 23B may be always brought into contact with the corresponding rolling bodies 23A. Alternatively, the contact plate may face the rolling bodies 23A with a minute gap therebetween. In this case, when the swing frame 4 rocks slightly in the lateral direction, the rolling bodies 23A on a side of the moving direction come into contact with the contact plate 23B.

When the rolling body 23A is brought into contact with the contact plate 23B, and the swing frame 4 moves vertically, the rolling body 23A rolls over the contact plate 23B, which lowers a resistance to the vertical movement of the swing frame 4.

The rolling body 23A may be directly brought into contact with the side wall 3A of the front frame 3. However, by removably providing the contact plate 23B on the side wall 3A, the contact plate 23B can be replaced when abraded, like the rolling body 23A. This in turn makes it possible to excellently retain the gap between the rolling body 23A and the contact plate 23B, and also to set a thickness of the contact plate 23B that attains an optimal gap.

The number of the rolling body 23A in the lateral oscillation regulation unit 23 is not limited to two and may be one, three or more than three. The contact plate 23B is configured to have a dimension that secures the contact with all rolling bodies 23A even when the swing frame 4 vertically moves. In addition, the shape of the rolling body 23A may not be a sphere and may be a column-shaped roller, and in this case, a shaft center of the roller is arranged in parallel with the shaft center 7S of the center shaft 7.

The lateral oscillation regulation unit 23 is disposed between the front upper portion of the support portion 14 of the swing frame 4 and the inner face of the lateral side walls 3A of the front frame 3. Alternatively, it may be disposed between a rear portion or intermediate portion of the support portion 14, or a rear portion or intermediate portion of the swing frame 4, and the front frame 3.

Further more, while the lateral oscillation regulation unit 23 is placed inside the front frame 3 and thus no portion is exposed outside, the contact plate 23B may protrude in a vertical direction from the front frame 3.

Between the front frame 3 and the swing frame 4, there is provided a first swing regulation unit 25 which includes upper and lower swing regulation bodies 25U, 25D inwardly protruding from an upper portion and a lower portion, respectively, of each of the right and left side walls 3A.

With the upper swing regulation body 25U, a flat contact face 14a formed on an upper face of the support portion 14 can be brought into contact, to prevent the front frame 3 from excessively lowered (the swing frame 4 from excessively lifted) relative to the front wheels 26 and the front axle case 6.

On the other hand, with a pair of right and left lower swing regulation bodies 25D, the projection 14b formed in the front portion of the support portion 14 can be brought into contact, to prevent the front frame 3 from excessively lifted (the swing frame 4 from excessively lowered).

By allowing the contact face 14a and the projection 14b to be brought into contact with the upper swing regulation body 25U and the lower swing regulation body 25D, respectively, it becomes possible to regulate an excessive upward and downward movements of the swing frame 4 when the suspension is functioning, and in addition, to suppress excessive pull-out and compressive forces on the suspension cylinder 8.

The intermediate portion in the front-rear direction of the swing frame 4 is made smaller in a lateral width, to thereby provide spaces between the intermediate portion and the corresponding right and left side walls 3A of the front frame 3, where the right and left suspension cylinders 8 are disposed. Connecting portions 4Ra protruding in the lateral direction are formed in a front lower portion of the rear swing frame 4R.

In each of the right and left suspension cylinders 8, an upper end portion of a cylinder body 8A is pivotally connected to the front frame 3 through a horizontal support shaft 40 extending in the lateral direction, and a lower end portion of a piston rod 8B is pivotally connected to the connecting portion 4Ra of the swing frame 4 through a connecting pin 41.

The connecting pins 41 are located: in the vertical direction, at a position which is the same as or somewhat lower than the position of the center shaft 7; in the lateral direction, at positions with approximately the same distance away from the center shaft 7; and in the front-rear direction, at a position close to the center shaft rear portion 7R, in such a manner that the connecting pins 41 do not interfere with the steering cylinder 34. In addition, in order to allow the suspension cylinder 8 to have a long stroke, the connecting portion 4Ra protrudes downward from a lower face of the rear swing frame 4R.

Each of the right and left suspension cylinders 8 is configured to elongate and contract by controlling a supply of operating oil. By making the right and left cylinders 8 elongate at the same time, the swing frame 4 together with the front axle case 6 is downward swung about the support shaft 5 (a front portion of the vehicle body 2 is raised relatively), while by making the right and left cylinders contract at the same time, the swing frame 4 together with the front axle case 6 is upward swung about the support shaft 5 (the front portion of the vehicle body 2 is lowered relatively).

Moreover, by locking the flow of the operating oil from the right and left suspension cylinders 8, the swing of the swing frame 4 and the front axle case 6 about the support shaft 5 is locked.

The hydraulic valve 21 and the accumulator 22 communicated with the right and left suspension cylinders 8 is disposed inside the front portion between the right and left side walls 3A of the front frame 3. To the front frame 3 is fixed the hydraulic valve 21, on whose lower face the accumulator 22 is directly mounted, and to whose upper face hydraulic piping 24 communicated with the suspension cylinder 8 is connected. The hydraulic piping 24 is disposed on an upper side of the first swing regulation unit 25 so as not to interfere with the swing frame 4 that is vertically movable.

The hydraulic valve 21 is configured to supply the operating oil through the hydraulic piping 24 to the right and left suspension cylinders 8, to stop the supply and to lock the flow of the oil, and the accumulator 22 is configured to pool the operating oil between the right and left suspension cylinders 8. Accordingly, there is exerted a suspension function of absorbing impacts or vibrations from agricultural field, road surface or the like acting on the front axle case 6.

The accumulator 22 includes a head-side accumulator 22H connected to the heads of the right and left suspension cylinders 8, and a rod-side accumulator 22L connected to the rods of the suspension cylinders 8, which are protected by a protection plate 38 attached to the front plate 3c of the front frame 3, from being brought into contact with obstacles on a front lower side.

The support shaft 5 as a pivot of the swing frame 4 may be located frontward of the engine E. However in this embodiment, as shown in FIG. 6, the support shaft 5 is located immediately below the engine E, and at the same time, below and frontward of a gravity center P of the vehicle body 2.

With the respect to the tractor T, when the vehicle is accelerated or braking is applied, a pitching moment is generated in the gravity center P of the vehicle body 2, which will cause a nose lift in which the front portion of the vehicle body 2 is raised or a nose dive in which the front portion of the vehicle body 2 is lowered. However in this embodiment, the support shaft 5 is disposed at a position in the front-rear direction that is likely to prevent occurrence of the nose lift and the nose dive.

Specifically, referring to FIG. 6, there are measured a height of the gravity center P, a span of ground contact between the front wheel 26 and the rear wheel, a shared load on the front wheels 26 or a load on the suspension cylinder 8, a shared load on the rear wheels and the like. A point Q1 is a point from among points at the height of the gravity center P, obtained by calculating a distance from the front wheel 26 using a ratio of the shared load on the front wheels 26 to the shared load on the rear wheels. This point is an equilibrium point between the presence and the absence of pitching movement generation (nose lift, nose dive) in the case of the tractor T with no weight added. The support shaft 5 is positioned rearward of an anti-pitching equilibrium line Y1 connecting a ground contact point of the front wheel 26 to the point Q1, and theoretically no nose dive upon acceleration nor nose lift upon braking is generated.

A point Q2 is a point from among points at the height of the gravity center P, obtained by calculating a distance from the front wheel 26 using a ratio of the shared load on the front wheels to the shared load on the rear wheels, which has been calculated using a load on the suspension cylinder 8, in the case of the tractor T under sudden braking. The point is an equilibrium point between the presence and the absence of pitching movement generation when the tractor T is under sudden braking. The support shaft 5 is positioned frontward of and close to an anti-pitching equilibrium line Y2 connecting the ground contact point of the front wheel 26 and the point Q2, and theoretically no nose dive nor nose lift upon sudden braking is generated.

The support shaft 5 may be positioned rearward of the anti-pitching equilibrium line Y2, but such a positioning is not preferred since there arise problems that a nose dive upon braking tends to occur, and the position of the support shaft 5 becomes low, which makes it difficult to secure a ground height of the tractor T. In addition, in the case of the tractor T, an excessive braking force is less likely to be applied, and thus even at a position frontward of and close to the anti-pitching equilibrium line Y2, a sufficient anti-pitching condition can be obtained with a moderate braking force actually applied.

By positioning the support shaft 5 of the swing frame 4 in an angular range between the anti-pitching equilibrium line Y1 calculated from the shared load on the front and rear wheels when no weight is added to the vehicle and the anti-pitching equilibrium line Y2 calculated from the shared load on the front and rear wheels upon sudden braking, it becomes possible to suppress a large nose lift or nose dive upon braking, and to realize a stable running.

It should be noted that, an anti-pitching angle $\lambda 1$ formed by the anti-pitching equilibrium line Y1 relative to a horizontal line is, for example, approximately 42-49°, and an anti-pitching angle $\lambda 2$ formed by the anti-pitching equilibrium line Y2 is, for example, approximately 24-30°.

A point Q3 is calculated (a point from among the height of the gravity center P is obtained by calculating a distance from the front wheel 26 using a ratio of the shared load on the front wheels 26 to the shared load on the rear wheels) for the tractor T whose front portion is loaded with a certain weight, and the support shaft 5 of the swing frame 4 is positioned on an anti-pitching equilibrium line Y3 connecting the point Q3 and the ground contact point of the front wheel 26. An anti-pitching angle formed by the anti-pitching equilibrium line Y3 passing the support shaft 5 relative to the horizontal line is set preferably to 34-44°, more preferably to 36-42°.

Referring to FIGS. 1-6, a swing regulating part 36, which is an approximately triangular block protruding outward, is attached to each of outer faces of the outer plate 3a of the front frame 3. A swing regulated part 37, which is an approximately triangular block, is attached to or integrally formed with each of upper faces of the right and left outer portions of the intermediate enlarged portion 6a of the front axle case 6. These members constitute a second swing regulation unit S.

The second swing regulation unit S is configured to regulate an excessive swing of the front axle case 6, by allowing the swing regulated part 37 to be brought into contact with the swing regulating part 36 when the front axle case 6 swings about the center shaft 7.

Figure 3:
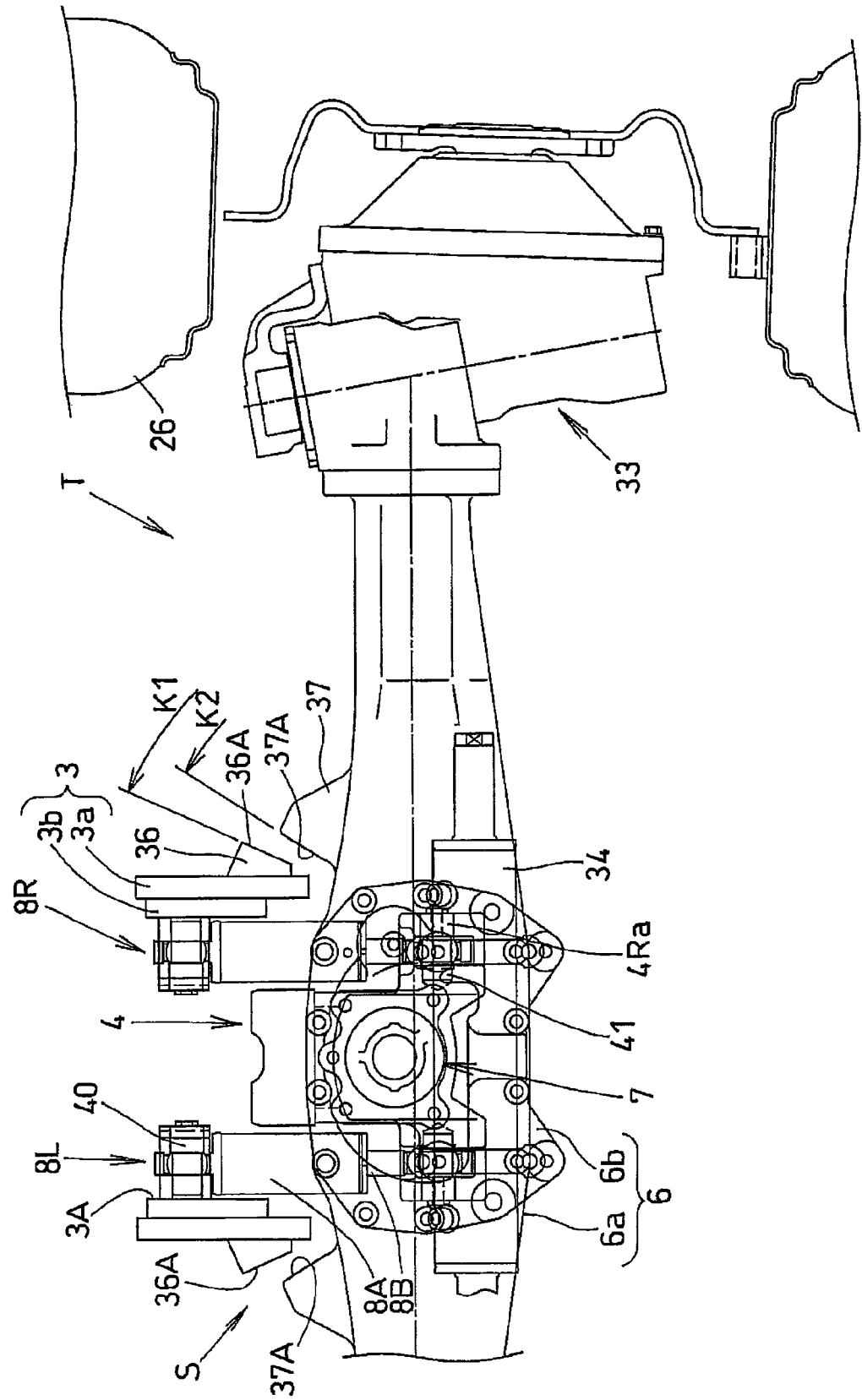
FIG. 3 is a front view of the same.

Each of the right and left swing regulating parts 36 on the front frame 3 has a receiving face 36A inclining upward as it extends outside in the lateral direction, and an inclination angle K1 of the receiving face 36A relative to a horizontal plane passing the center shaft 7 is set to, for example, approximately 61-71° (see FIG. 3).

Each of the right and left swing regulated parts 37 on the front axle case 6 has a contacting face 37A inclining upward as it extends outside in the lateral direction, and an inclination angle K2 of the contacting face 37A relative to the horizontal plane passing the center shaft 7 is set to, for example, 50-63°. The inclination angle K1 of the receiving face 36A is set larger by approximately 6-10° than the inclination angle K2 of the contacting face 37A.

As the swing frame 4 vertically swings, a stroke of the contacting face 37A of the front axle case 6 reaches, for example, approximately 30-44 mm above and below a middle position in the vertical direction, and thus a vertical distance from the front frame 3 (receiving face 36A) to the front axle case 6 (contacting face 37A) varies in the range of approximately 60-88 mm, between the lowermost position and the uppermost position.

Figure 4:
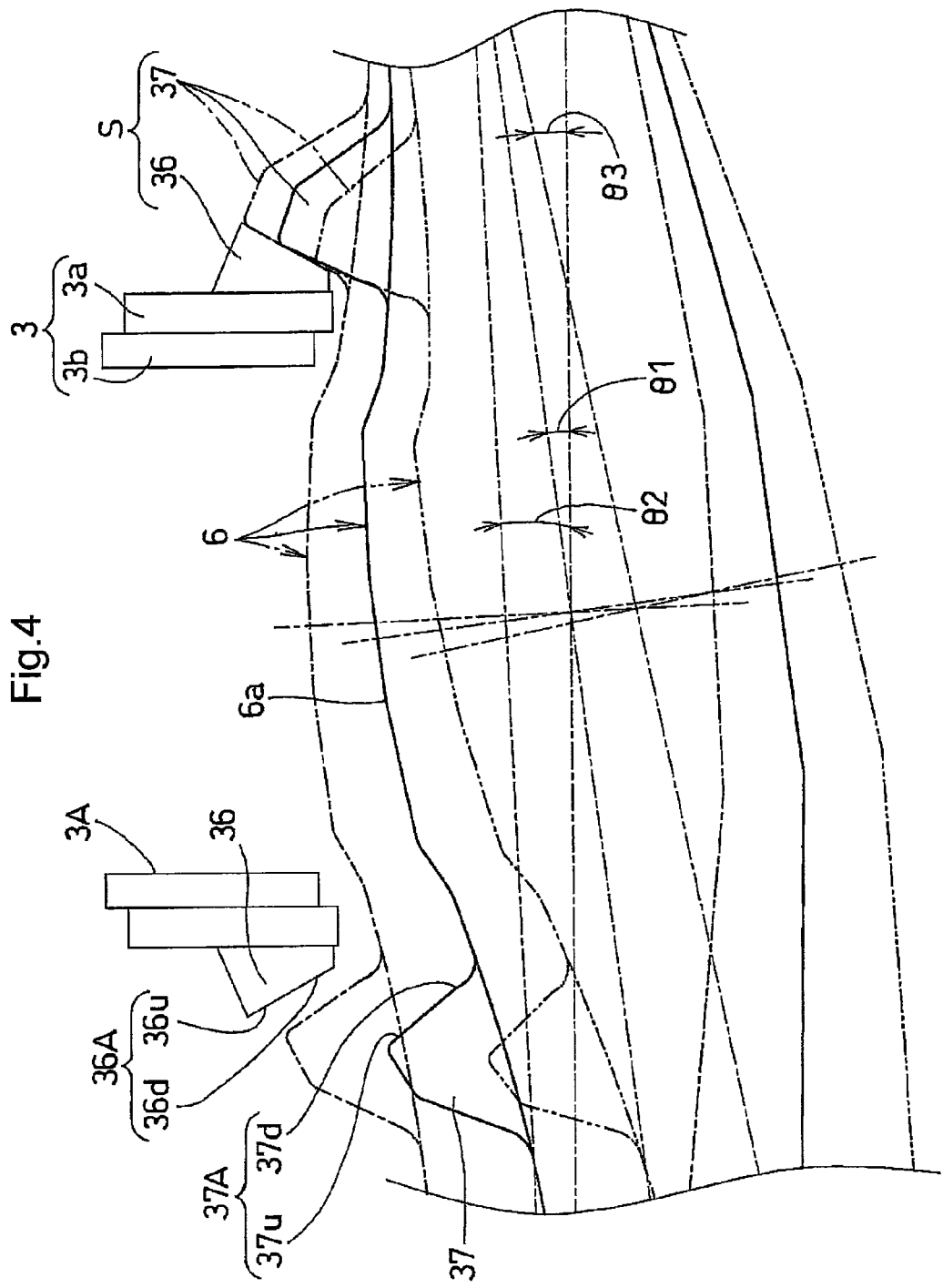
FIG. 4 is an explanatory diagram showing an action of a second swing regulation unit.

Referring to FIG. 4, when the swing frame 4 is at the middle position in its vertically swingable range (the front frame 3 is also at the middle position in the vertical direction) and the front axle case 6 swings about the center shaft 7, the contacting face 37A is brought into contact with the receiving face 36A, at a swing angle θ1 of approximately 6-8°. In the following descriptions, a case of the present embodiment where the receiving face 36A and the contacting face 37A are inclined is compared with a case where the swing regulating part 36 and the swing regulated part 37 have the horizontal contacting face 37A and the horizontal receiving face 36A, respectively, with the proviso that approximately the same range is used in both cases for the contact angle θ1 at the middle position in the vertical direction (it is supposed that the front axle case 6, having the horizontal contacting/receiving faces, at the middle position is swingable at the angle of approximately 6-8°.

Specifically, when the swing frame 4 (and thus the front axle case 6) is at the uppermost position (the front frame 3 is at the lowermost position) and the front axle case 6 swings about the center shaft 7, the contacting face 37A is brought into contact with the receiving face 36A at a swing angle θ2 of approximately 3°. In the case of the horizontal contacting face 37A and the horizontal receiving face 36A, when the front axle case 6 swings, the contact angle θ2 at the uppermost position becomes approximately 1°, and thus the contact angle θ2 in the case of the inclined faces are much larger. Therefore, when the front frame 3 is low, an angular range that allows the front axle case 6 to swing can be made wider.

When the swing frame 4 (and thus the front axle case 6) is at the lowermost position (the front frame 3 is at the uppermost position) and the front axle case 6 swings about the center shaft 7, the contacting face 37A is brought into contact with the receiving face 36A at a swing angle θ3 of approximately 11-13°. In the case of the horizontal contacting face 37A and the receiving face 36A, when the front axle case 6 swings, the contact angle θ3 at the lowermost position becomes approximately 20°, and thus the contact angle θ3 in the case of the inclined faces are much smaller. Therefore, when the front frame 3 is high, an excessive swing of the front axle case 6 can be suppressed.

These discussions regarding the comparison are summarized in a table below.

| | Swing angle of front axle case | |
|---|---|---|
| | Inclined | Horizontal |
| Uppermost position | 3 | 1 |
| Middle position | 6-8 | 6-8 |
| Lowermost position | 11-13 | 20 |

Since the contacting face 37A and the receiving face 36A incline as it extends outside in the lateral direction, the gap between these faces in a swing direction about the center shaft 7 can be made less affected by a change in the height of the front frame 3. In other words, a degree of change in the angular limitation of the swinging (rolling) of the front axle case 6 can be made smaller than a degree of change in the height of the front frame 3, and especially when the front frame 3 is at the lowermost position.

The receiving face 36A of the front axle case 6 is the inclined face including a lowermost receiving portion 36d and an uppermost receiving portion 36u contiguously formed to each other, while the contacting face 37A is the inclined face including a lowermost contacting portion 37d and an uppermost contacting portion 37u contiguously formed to each other.

When the front axle case 6 is at the middle position in the vertical direction (the front frame 3 is also at the middle position in the vertical direction), the uppermost contacting portion 37u of the contacting face 37A is brought into contact with a middle portion (between the lowermost receiving portion 36d and the uppermost receiving portion 36u) in the vertical direction of the receiving face 36A; when the front axle case 6 is at the lowermost position (the front frame 3 is at the uppermost position), the uppermost contacting portion 37u of the contacting face 37A is brought into contact with the lowermost receiving portion 36d of the receiving face 36A; and when the front axle case 6 is at the uppermost position (the front frame 3 is at the lowermost position), the entire contacting face 37A and the entire receiving face 36A are brought into contact with each other.

When the front axle case 6 is at the uppermost position (the front frame 3 is at the lowermost position) and the entire contacting face 37A and the entire receiving face 36A are brought into contact with each other, a large load can be received by a large surface. Therefore, the contacting face 37A and the receiving face 36A can be used for regulating not only the swing (rolling) of the front axle case 6, but also the swing (pitching) of the swing frame 4.

It should be noted that, in the present invention, it is desirable that the shapes and the positional relationships, such as front-rear, right-left and upper-lower relationships, of the members in the above-described embodiment are configured as shown in FIGS. 1-8. However, the shapes and the positional relationships are not limited to the embodiment above, and the members and configurations thereof, and combinations of the members, may be altered.

For example, with respect to the lateral oscillation regulation unit 23, the rolling body 23A may be fitted into a block provided on the front frame 3, the right and left projections 14b of the swing frame 4 may be made elongated in the vertical direction, and the end face of the projection 14b may be allowed to be brought into contact with the rolling body 23A.

In the embodiment above, the right and left suspension cylinders 8 for the front wheel 26 are provided between the front frame 3 and the swing frame 4. Alternatively, they may be provided between the front frame 3 and the front axle case 6.

What is claimed is:

1. A suspension system for a vehicle comprising an engine, a vehicle body including a front portion having a front frame extending frontward from the engine, and a front axle case having front wheels suspended thereby, the system comprising:

a swing frame swingably supported by the front portion of the vehicle body about a support shaft extending in a lateral direction, the swing frame being configured to support the front axle case, so as to allow the front axle case to swing about a center shaft extending in a front-rear direction;

right and left suspension cylinders for the front wheels provided on the swing frame; and a lateral oscillation regulation unit which is provided between the swing frame and the front frame and configured to regulate an oscillation of the swing frame by contact in the lateral direction.

2. The suspension system for a vehicle according to claim 1, wherein
the front frame comprises right and left side walls configured to flank the swing frame, and
the lateral oscillation regulation unit comprises a rolling body which is configured to be brought into contact with the side wall, and the rolling body is configured to roll over a side face portion defined by the front frame.

3. The suspension system for a vehicle according to claim 2, wherein
the side face portion is provided by a surface of a contact plate removably fixed to the side wall.

4. The suspension system for a vehicle according to claim 1, wherein
a front portion of the swing frame is positioned inside the front frame, and
the lateral oscillation regulation unit is positioned between the front portion of the swing frame and the front frame, and inside the front frame.

* * * * *